(12) United States Patent
Takahashi et al.

(10) Patent No.: US 9,638,226 B2
(45) Date of Patent: May 2, 2017

(54) COUPLING STRUCTURE INCLUDING STUD BOLT

(71) Applicant: DENSO CORPORATION, Kariya, Aichi-pref. (JP)

(72) Inventors: Tomohiro Takahashi, Okazaki (JP); Seiji Nakayama, Obu (JP)

(73) Assignee: DENSO CORPORATION, Kariya (JP)

( * ) Notice: Subject to any disclaimer, the term of this patent is extended or adjusted under 35 U.S.C. 154(b) by 5 days.

(21) Appl. No.: 14/824,254

(22) Filed: Aug. 12, 2015

(65) Prior Publication Data

US 2016/0061240 A1  Mar. 3, 2016

(30) Foreign Application Priority Data

Aug. 29, 2014  (JP) .................................. 2014-174908

(51) Int. Cl.
*F16B 35/00* (2006.01)
*F16B 5/02* (2006.01)
*F16B 41/00* (2006.01)

(52) U.S. Cl.
CPC .......... *F16B 5/0275* (2013.01); *F16B 41/005* (2013.01)

(58) Field of Classification Search
CPC .. F16B 5/0275; F16B 5/0283; F16B 23/0007; F16B 35/00; F16B 35/04; F16B 35/041; F16B 35/042; F16B 41/005
USPC .......................... 411/383, 388, 389, 403, 424
See application file for complete search history.

(56) References Cited

U.S. PATENT DOCUMENTS

| | | | | |
|---|---|---|---|---|
| 188,668 | A | * 3/1877 | Pleukharp | F16B 35/042 411/389 |
| 2,741,289 | A | * 4/1956 | Grow | F16B 39/282 411/185 |
| 3,455,198 | A | * 7/1969 | Barrett | F16B 5/0275 411/107 |
| 3,897,713 | A | * 8/1975 | Gugle | F16B 5/0275 156/303.1 |
| 4,157,674 | A | * 6/1979 | Carlson | F16B 5/0275 411/324 |
| 4,223,585 | A | * 9/1980 | Barth | F16B 23/0076 411/386 |
| 4,304,503 | A | * 12/1981 | Gehring | F16B 35/04 29/525.04 |
| 4,334,815 | A | * 6/1982 | Knohl | F16B 35/007 411/368 |

(Continued)

FOREIGN PATENT DOCUMENTS

JP  4702806  3/2011

*Primary Examiner* — Roberta Delisle
(74) *Attorney, Agent, or Firm* — Nixon & Vanderhye PC

(57) ABSTRACT

A stud bolt has a first thread portion, a second thread portion, an engagement portion and a large diameter portion. The first thread portion is screwable into a first member about a screw axis. The second thread portion is screwable into a second member about the screw axis and is provided coaxially with the first thread portion. The engagement portion is provided on a side of the second thread portion, which is opposite from the first thread portion. The large diameter portion has a circular cross-section perpendicular to the screw axis. The large diameter portion is located between the first thread portion and the second thread portion. An outer diameter of the large diameter portion is larger than an outer diameter of the first thread portion and the outer diameter of the second thread portion.

13 Claims, 10 Drawing Sheets

(56) References Cited

U.S. PATENT DOCUMENTS

| | | | | |
|---|---|---|---|---|
| 4,787,790 | A * | 11/1988 | Shirai | F16B 35/041 |
| | | | | 411/109 |
| 5,232,323 | A * | 8/1993 | Baehre | F16B 33/002 |
| | | | | 411/109 |
| 6,341,917 | B1 * | 1/2002 | Schubring | F16B 5/0275 |
| | | | | 403/296 |
| 6,592,311 | B2 * | 7/2003 | Wojciechowski | B23P 19/062 |
| | | | | 411/107 |
| 6,918,727 | B2 * | 7/2005 | Huang | F16B 5/0275 |
| | | | | 411/107 |
| 7,386,960 | B2 * | 6/2008 | Molteni | E04B 2/7433 |
| | | | | 160/135 |
| 7,922,433 | B2 * | 4/2011 | Ricciardo | F16B 39/10 |
| | | | | 411/119 |
| 2003/0206787 | A1 * | 11/2003 | Huang | F16B 5/0275 |
| | | | | 411/412 |
| 2007/0053766 | A1 * | 3/2007 | Lin | E06B 3/9636 |
| | | | | 411/389 |
| 2011/0158766 | A1 * | 6/2011 | Mitrovic | F16B 5/0275 |
| | | | | 411/393 |

* cited by examiner

COMPARATIVE EXAMPLE

COUPLING STRUCTURE INCLUDING STUD BOLT

CROSS REFERENCE TO RELATED APPLICATION

This application is based on and incorporates herein by reference Japanese Patent Application No. 2014-174908 filed on Aug. 29, 2014.

TECHNICAL FIELD

The present disclosure relates to a stud bolt and a coupling structure that uses the stud bolt.

BACKGROUND

Conventionally, a coupling structure in which multiple members are integrated by a stud bolt is known. Described in Patent Document 1 (JP 4702806 B2) is a structure including a flange and a cylinder head which are provided in an exhaust manifold and integrated by the stud bolt. The stud bolt extends through a through-hole made on the flange and is screwed to a female thread made on the cylinder head. A double nut is screwed to the stud bolt on a side of the flange that is opposite from the cylinder head. The double nut fixes the flange and the cylinder head. The stud bolt has a hexalobular external on an end opposite from the cylinder head. The hexalobular external is fitted in protrusions that are made on an inner wall of a through-hole of a lock plate. The fixing plate is fixed by a hex bolt to the cylinder head and prevents the double nut screwed to the stud bolt from loosing.

In the coupling structure described in Patent Document 1, the double nut engaged with the stud bolt is exposed outside of the flange and the cylinder head. Moreover, the lock plate is easily removed from the hexalobular external of the stud bolt by removal of the hex bolt. Therefore, if a tool such as a spanner is engaged with the double nut and then the stud bolt is rotated with the double nut about an axial direction, a linkage of the exhaust manifold and the cylinder head may be separated. If the multiple members integrated by the stud bolt are dismantled with evil intent, the members may be stolen.

SUMMARY

It is an objective of the present disclosure to provide a stud bolt and a coupling structure in which the stud bolt is used. The stud bolt is capable of prevent multiple members integrated together from being separated.

According to an aspect of the present disclosure, a stud bolt includes a first thread portion, a second thread portion, an engagement portion and a large diameter portion. The first thread portion is screwable into a first member about a screw axis. The second thread portion is screwable into a second member about the screw axis and is provided coaxially with the first thread portion. The engagement portion is provided on a side of the second thread portion, which is opposite from the first thread portion, and an outer diameter of the engagement portion is smaller than an outer diameter of the second thread portion. The engagement portion is engageable with a fixing tool. The large diameter portion has a circular cross-section that is perpendicular to the screw axis, and the large diameter portion is located between the first thread portion and the second thread portion. An outer diameter of the large diameter portion is larger than an outer diameter of the first thread portion and the outer diameter of the second thread portion.

When the first member and the second member are integrated by the stud bolt, the first member is fixed between the large diameter portion and a nut that is fixed to the first thread portion by screwing and the second member is fixed between the large diameter portion and a nut that is fixed to the second thread portion by screwing. Since the cross-section of the large diameter portion that is perpendicular to the screw axis has a circular shape, a tool such as a spanner cannot be engaged with the large diameter portion even if the large diameter portion is exposed to outside the first member and the second member. The stud bolt can be prevented from being rotated about the screw axis by a tool. Hence, the stud bolt is capable of preventing the first member and the second member integrated together from being separated. Therefore, the stud bolt may be appropriate to prevent multiple members integrated together from being stolen. The nuts can be easily fixed to the first member and the second member because the stud bolt has the engagement portion.

According to another aspect of the present disclosure, a coupling structure includes a stud bolt, a first member, a female screw portion, a second member, a nut and a cylinder member. The stud bolt includes a first thread portion, a second thread portion and a large diameter portion. The first thread portion is provided coaxially with the large diameter portion on one side of the large diameter portion. The second thread portion is provided coaxially with the large diameter portion on another side of the large diameter portion. An outer diameter of the large diameter portion is larger than an outer diameter of the first thread portion and an outer diameter of the second thread portion. The first member has a hole through which the first thread portion of the stud bolt extends. The first member contacts the large diameter portion. The female thread portion is engaged with the first thread portion inside of the hole of the first member. The female thread portion fixes the first member on the large diameter portion. The second member has a hole through which the second thread portion of the stud bolt extends. The second member contacts the large diameter portion. The nut is engaged with the second thread portion, and the nut fixes the second member on the large diameter portion. The cylinder member surrounds an outside of the large diameter portion of the stud bolt in a radial direction of the large diameter portion.

The cylinder member may prevent the large diameter portion from being engaged with a tool such as a spanner. Therefore, the coupling structure is capable of preventing the first member and the second member from being separated.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
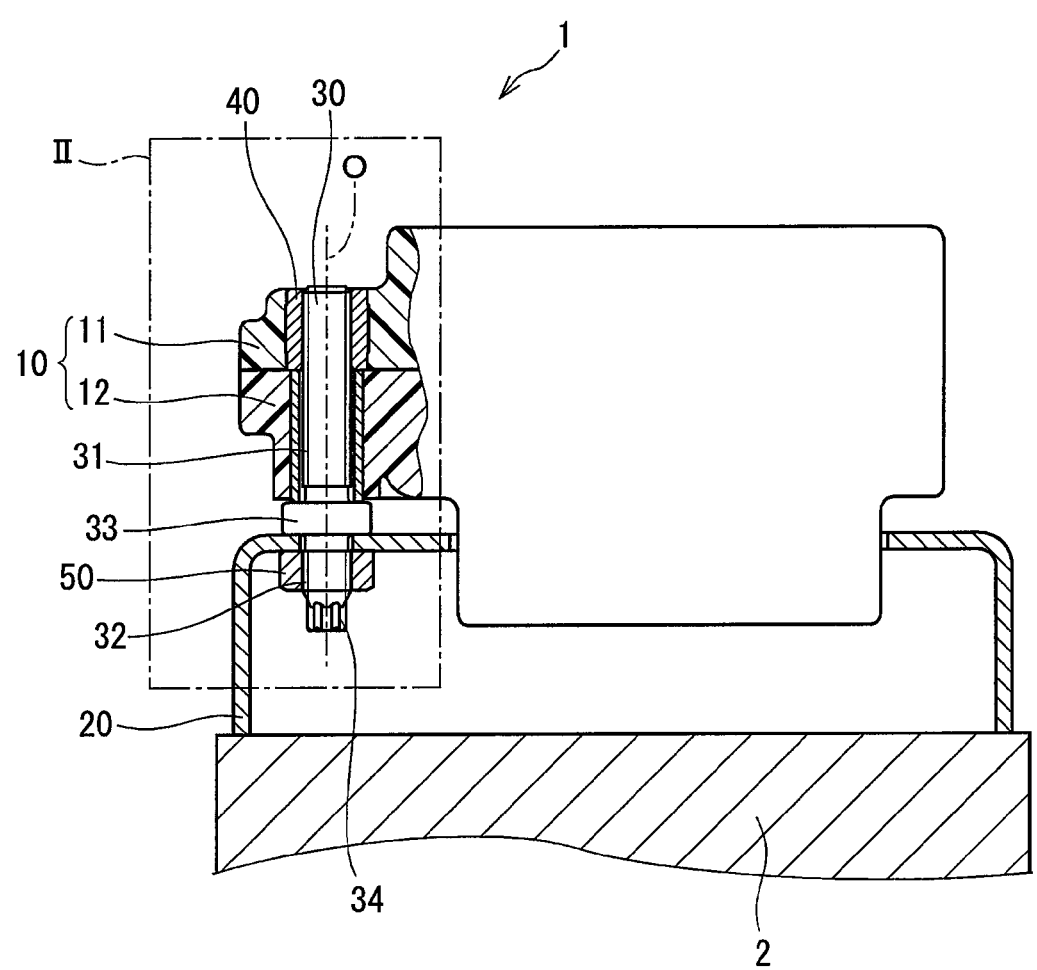
FIG. 1 is a partially sectional diagram illustrating a coupling structure according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described referring to FIGS. 1 to 6. A coupling structure 1 of the first embodiment has a configuration in which a first member 10 and a second member 20 are integrated by a stud bolt 30. The first member 10 may be a motor housing, an electronic control device or various sensors, for example. The second member 20 may be a bottomed and cylindrical bracket, for example. The second member 20 is fixed to a large-sized component 2, such as a transmission or an engine cover.

Figure 3:
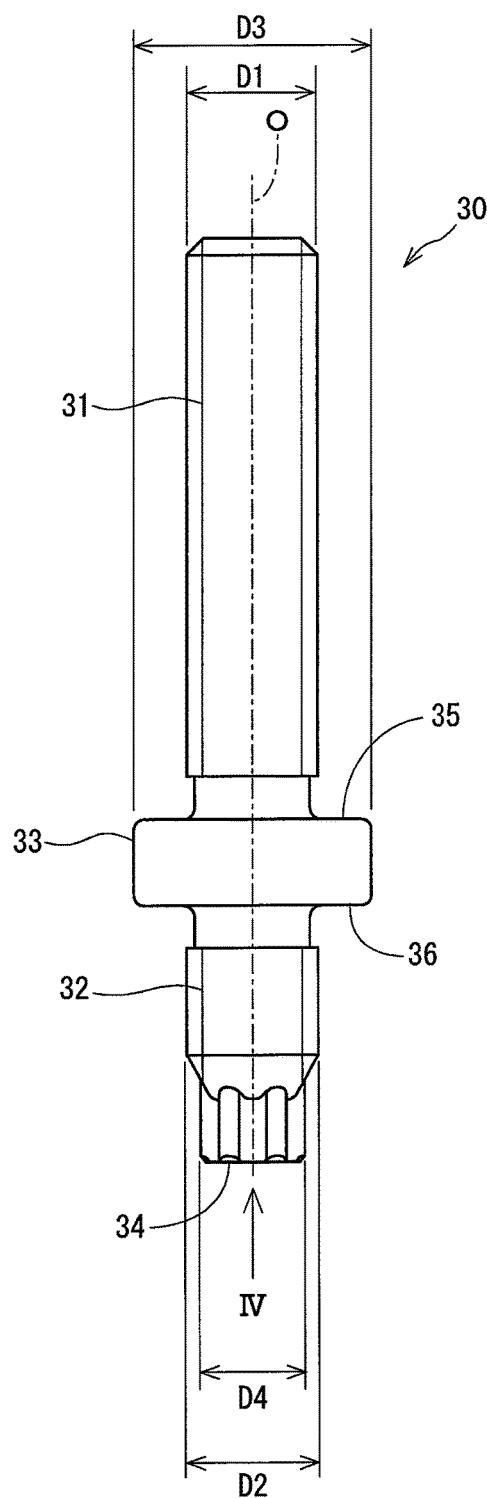
FIG. 3 is a side view illustrating a stud bolt according to the first embodiment.
Figure 4:
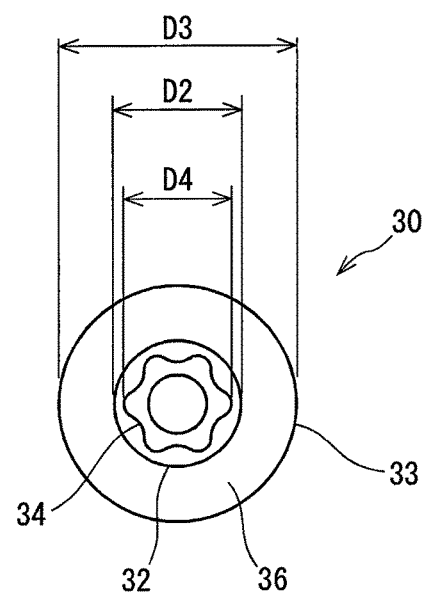
FIG. 4 is a diagram illustrating the stud bolt when the stud bolt is viewed from an arrow IV of FIG. 3.

The coupling structure 1 includes the stud bolt 30, the first member 10, the second member 20, a first nut 40 and a second nut 50. The stud bolt 30 will be described first. As illustrated in FIGS. 3 and 4, the stud bolt 30 has a first thread portion 31, a second thread portion 32, a large diameter portion 33 and an engagement portion 34. The first thread portion 31 is provided on one side of the stud bolt 30 in an axial direction of the stud bolt 30. The second thread portion 32 is provided on the other side of the stud bolt 30, which is opposite from the first thread portion 31, in the axial direction of the stud bolt 30. The first thread portion 31 and the second thread portion 32 may be either a right-hand screw or a left-hand screw.

The large diameter portion 33 has a circular cylindrical shape and is provided between the first thread portion 31 and the second thread portion 32. An outer diameter D3 of the large diameter portion 33 is larger than both an outer diameter D1 of the first thread portion 31 and an outer diameter D2 of the second thread portion 32. The large diameter portion 33 is not necessary to have a circular cylindrical shape, and the large diameter portion 33 may at least have a circular shape in cross-section perpendicular to an axis O of the stud bolt 30. The large diameter portion 33 has a first contact surface 35 perpendicular to the axis O on an end surface facing to the first thread portion 31. The first contact surface 35 is capable of contacting the first member 10 that is fixed to the first thread portion 31. The large diameter portion 33 has a second contact surface 36 perpendicular to the axis O on an end surface facing to the second thread portion 32. The second contact surface 36 is capable of contacting the second member 20 that is fixed to the second thread portion 32.

The engagement portion 34 is provided on an end part of the stud bolt 30 and is positioned adjacent to the second thread portion 32. The stud bolt 30 has an engaging end formed by the engagement portion 34. An outer diameter D4 of the engagement portion 34 is smaller than the outer diameter D2 of the second thread portion 32. The engagement portion 34 may be a hexalobular external or a hexagonal prism, for example, and can be engaged with a tool such as a box wrench corresponding to a shape of the engagement portion 34.

Figure 2:
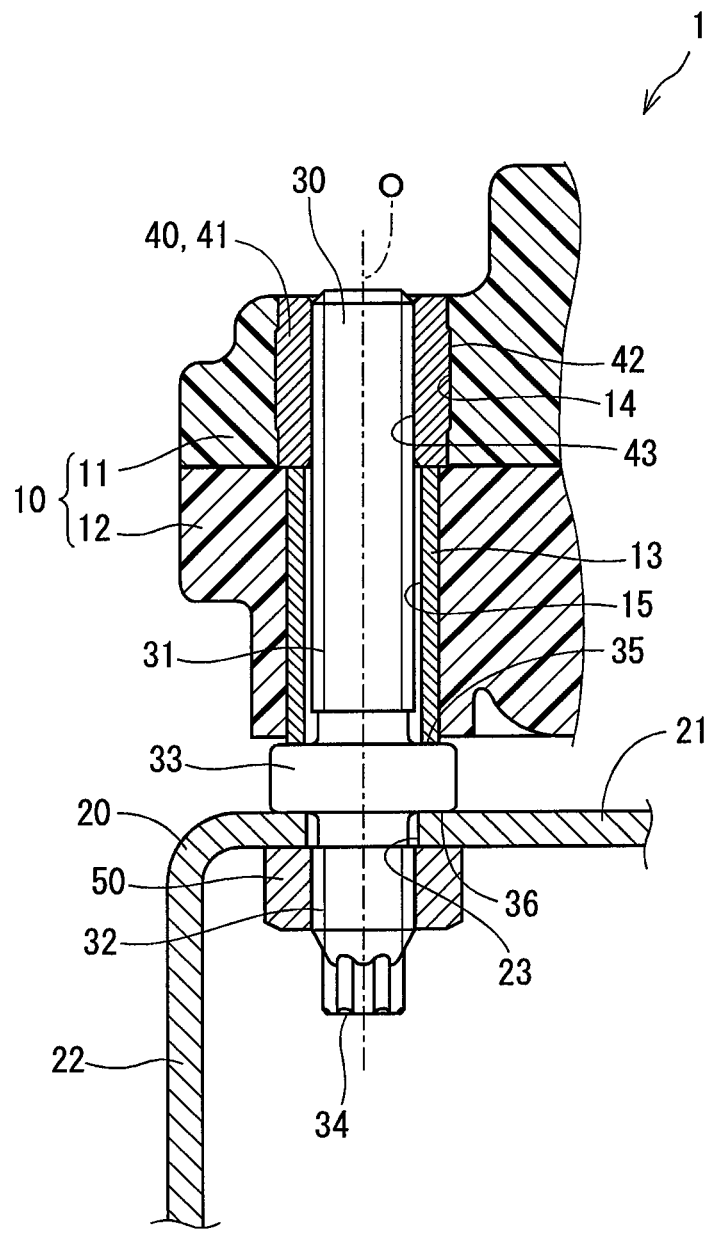
FIG. 2 is a partially sectional diagram illustrating a part II of FIG. 1.

The first member 10 and the first nut 40 will be described below. As shown in FIGS. 1 and 2, the first member 10 includes an upper member 11, a lower member 12 and a collar 13. The first nut 40 is fixed to the upper member 11 in a hole 14 that is provided in the upper member 11. The first nut 40 is an insert nut, for example. The first nut 40 includes a nut body 41 having a cylindrical shape, and an uneven surface 42 on an outer surface of the nut body 41 in a radial direction of the nut body 41. The first nut 40 is press-fitted to an inner wall of the hole 14 of the upper member 11. A female thread 43 formed on an inner surface of the nut body 41 in the radial direction of the nut body 41 can be fitted to the first thread portion 31 by screwing. The first nut 40 of the present embodiment may correspond to a female thread portion fitted to the first thread portion 31 by screwing.

A tubular-shaped collar 13 is bonded to the lower member 12 by insert molding or adhesive bonding. An inner diameter of a hole 15 of the collar 13 is larger than the outer diameter D1 of the first thread portion 31. The first thread portion 31 extends through the hole 15 of the collar 13. The screw fitting of the first thread portion 31 to the first nut 40 causes an end surface of the collar 13 facing to the large diameter portion 33 to contact the first contact surface 35 of the large diameter portion 33. Therefore, the first member 10 is fixed to the large diameter portion 33.

The second member 20 and the second nut 50 will be described below. The second member 20 has a bottomed and cylindrical shape, and includes a set portion 21 and a shielding portion 22. The set portion 21 extends perpendicularly to the axis O of the stud bolt 30. The shielding portion 22 stretches parallel to the axis O from an outer edge of the set portion 21 so as to have a cylindrical shape. The set portion 21 has a hole 23 into which the second thread portion 32 of the stud bolt 30 can be inserted. The second thread portion 32 inserted into the hole 23 is fitted to the second nut 50 by screwing. The screw fitting of the second thread portion 32 to the second nut 50 causes a surface of the set portion 21 facing to the large diameter portion 33 to contact the second contact surface 36. Therefore, the second member 20 is fixed to the large diameter portion 33. The second nut 50 of the present embodiment may be used as a nut that is screwed to the second thread portion 32 so as to fix the second member 20 to the large diameter portion 33. The shielding portion 22 is provided on an outside of the second nut 50 in a radial direction of the second nut 50. The shielding portion 22 screens the second nut 50 and the engagement portion 34 from outside the first member 10 and the second member 20. Therefore, the shielding portion 22 is capable of preventing a tool such as a wrench from being engaged with the second nut 50 or the engagement portion 34 from outside the first member 10 and the second member 20.

According to the coupling structure 1 of the first embodiment, when the first member 10 and the second member 20 are integrated by the stud bolt 30, the large diameter portion 33 is exposed to outside the first member 10 and the second member 20. However, since the large diameter portion 33 has a circular cylindrical shape, a tool such as a wrench cannot be engaged with the large diameter portion 33. Therefore, the stud bolt 30 is protected from being rotated around the axis O by the tool. Thus, separation of the first member 10 and the second member 20 with evil intent can be prevented. Hence, the coupling structure 1 of the first embodiment may be appropriate to protection from stealing of the first member 10 and the second member 20.

Figure 5:
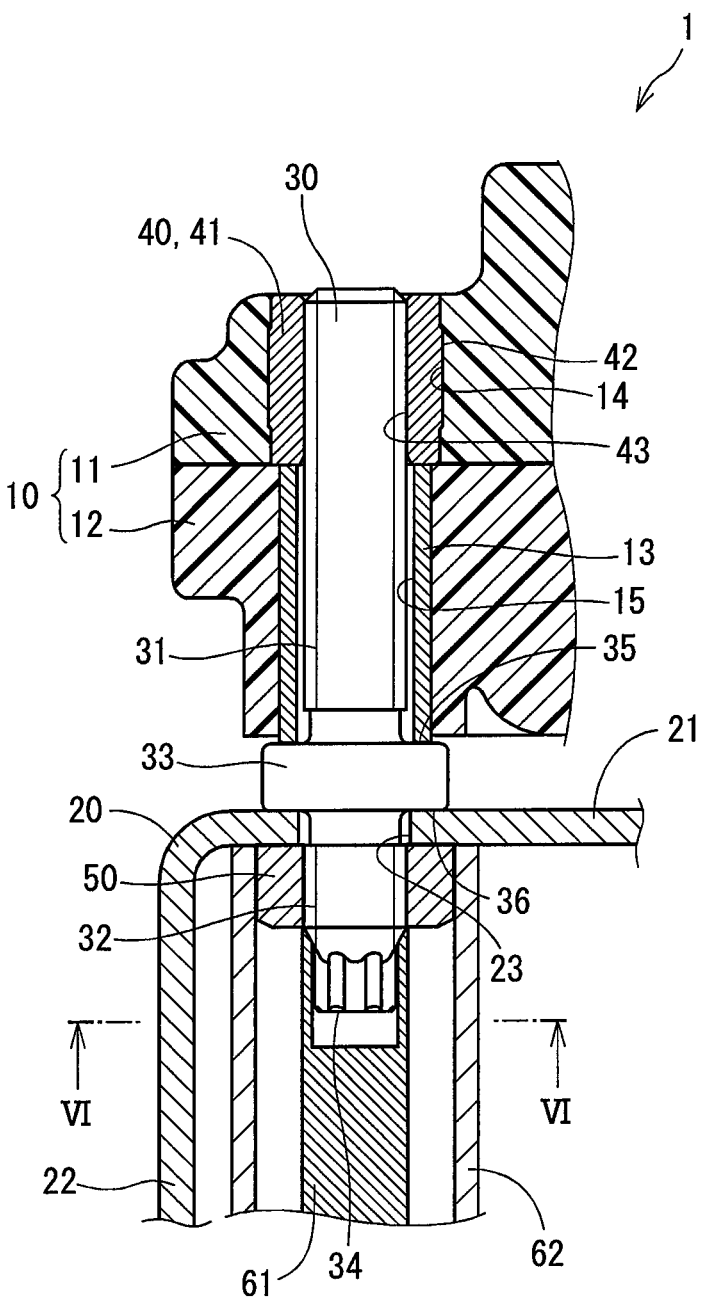
FIG. 5 is a partially sectional diagram illustrating the coupling structure that is being assembled, according to the first embodiment.
Figure 6:
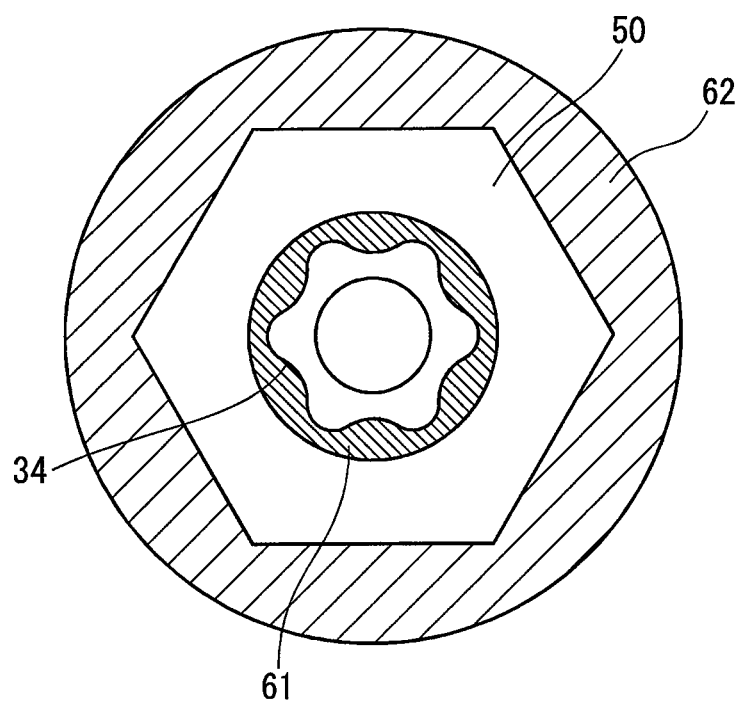
FIG. 6 is a partially sectional diagram taken along a line VI-VI of FIG. 5.

A method for assembling the coupling structure of the first embodiment will be described below referring to FIGS. 5 and 6. First, the first nut 40 is bonded to an inner peripheral surface of the hole 14 of the upper member 11 by press-fitting. Next, the first thread portion 31 of the stud bolt 30 is inserted into the hole 15 of the collar 13 that is bonded to an inner peripheral surface of the lower member 12. Subsequently, the stud bolt 30 is rotated about the axis of the stud bolt 30 by rotating a first box wrench 61 engaged with the engagement portion 34 so that the first thread portion 31 is screwed to the female thread 43 of the first nut 40. Accordingly, the collar 13 of the first member 10 contacts the first contact surface 35 of the large diameter portion 33, and consequently the first nut 40, the first member 10 and the stud bolt 30 are fixed.

Next, the second thread portion 32 is inserted into the hole 23 provided on the set portion 21 of the second member 20. The second nut 50 is rotated about the axis O of the stud bolt 30 by rotating the second box wrench 62 engaged with the second nut 50 so that the second nut 50 is screwed to the second thread portion 32. While the second nut 50 is screwed to the second thread portion 32, the stud bolt 30 may be prevented from being rotated about the axis by using the first box wrench 61 engaged with the engagement portion 34. However, when the frictional force between the collar 13 of the first member 10 and the first contact surface 35 of the large diameter portion 33 is larger than a torque of the second box wrench 62, a step for preventing the stud bolt 30 from being rotated by the first box wrench 61 can be omitted. When the second nut 50 is screwed to the second thread portion 32, the set portion 21 of the second member 20 contacts the second contact surface 36 of the large diameter portion 33. Consequently, the stud bolt 30, the second member 20 and the second nut 50 are fixed. The second member 20 is fixed to the large-sized component 2 such as a transmission or an engine cover.

Figure 7:
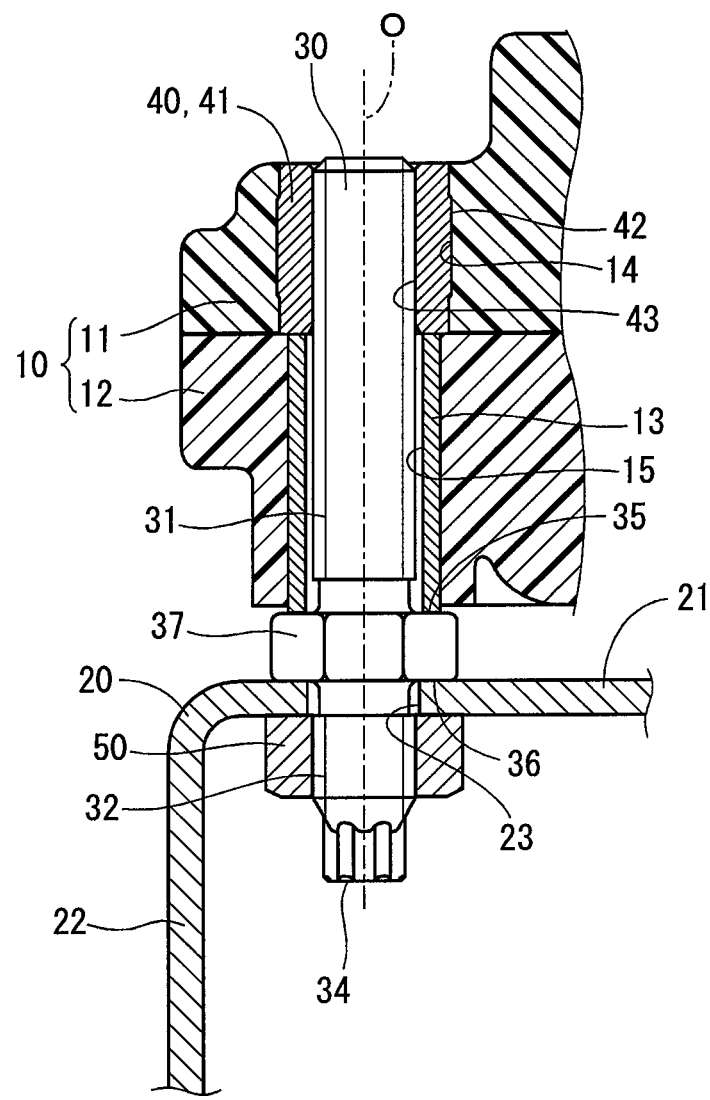
FIG. 7 is a partially sectional diagram illustrating a coupling structure according to a comparative example.

A coupling structure of a comparative example is illustrated in FIG. 7. A stud bolt 30 of the coupling structure of the comparative example has a large diameter portion 37 that is shaped in a hexagonal prism. Therefore, in the coupling structure of the comparative example, a tool such as a spanner can be engaged with the large diameter portion 37 that is exposed to outside a first member 10 and a second member 20. If the stud bolt 30 is rotated about an axis of the stud bolt 30 by the tool, a press-fitted portion between a hole 14 of an upper member 11 and an uneven surface 42 of a first nut 40, a female thread 43 of a first nut 40, a female thread of a second nut 50 or the stud bolt 30 itself may be broken. If the first member 10 and the second member 20 integrated by the stud bolt 30 are separated from each other in that way, the first member 10 or the second member 20 may be stolen.

By contrast, the stud bolt 30 of the first embodiment and the coupling structure 1 using the stud bolt 30 have effects described below.

(1) The stud bolt 30 of the first embodiment has the large diameter portion 33 between the first thread portion 31 and the second thread portion 32. The large diameter portion 33 is larger in outer diameter than the first thread portion 31 and the second thread portion 32. A sectional surface of the large diameter portion 33 perpendicular to the axis O is shaped in a circle. Since the sectional surface of the large diameter portion 33 that is perpendicular to the axis O has a circular shape, a tool such as a spanner cannot be engaged with the large diameter portion 33 even if the large diameter portion 33 is exposed to outside the first member 10 and the second member 20 when the first member 10 and the second member 20 are integrated by the stud bolt 30. Hence, the stud bolt 30 is capable of preventing the first member 10 and the second member 20 integrated together from being separated. Therefore, the stud bolt 30 may be appropriate to prevent the first member 10 and the second member 20 from being stolen.

(2) The large diameter portion 33 of the stud bolt 30 of the first embodiment has the first contact surface 35 that is perpendicular to the axis O on an end surface facing to the first thread portion 31. The large diameter portion 33 has the second contact surface 36 that is perpendicular to the axis O on an end surface facing to the second thread portion 32. The stud bolt 30 is capable of fixing the first member 10 on the first contact surface 35 of the large diameter portion 33 by screwing the first nut 40 to the first thread portion 31. The stud bolt 30 is also capable of fixing the second member 20 on the second contact surface 36 of the large diameter portion 33 by screwing the second nut 50 to the second thread portion 32.

(3) The large diameter portion 33 of the stud bolt 30 according to the first embodiment has a circular cylindrical shape. Therefore, the tool such as a spanner cannot be fitted with the large diameter portion 33. Hence, the stud bolt 30 is capable of preventing the tool from being engaged with the large diameter portion 33.

(4) In the coupling structure 1 of the first embodiment, a cross-sectional surface of the stud bolt 30 that fixes the first member 10 and the second member 20 is shaped in circle. In the coupling structure 1, a tool such as a spanner cannot be engaged with the large diameter portion 33 even when the large diameter portion 33 of the stud bolt 30 is exposed to the outside of the first member 10 and the second member 20. Therefore, the coupling structure 1 is capable of preventing the first member 10 and the second member 20 from being separated.

(5) In the coupling structure 1 of the first embodiment, the second member 20 has the shielding portion 22 that screens the second nut 50 and the engagement portion 34 on the outside of the second nut 50 in the radial direction. Therefore, the shielding portion 22 is capable of preventing the tool such as a spanner from being engaged with the second nut 50 and the engagement portion 34 of the stud bolt 30.

(6) In the coupling structure 1 of the first embodiment, the first nut 40 is an insert nut. Therefore, the coupling structure 1 is capable of preventing the first nut 40 from being loosened from the first member 10.

Second Embodiment

Figure 8:
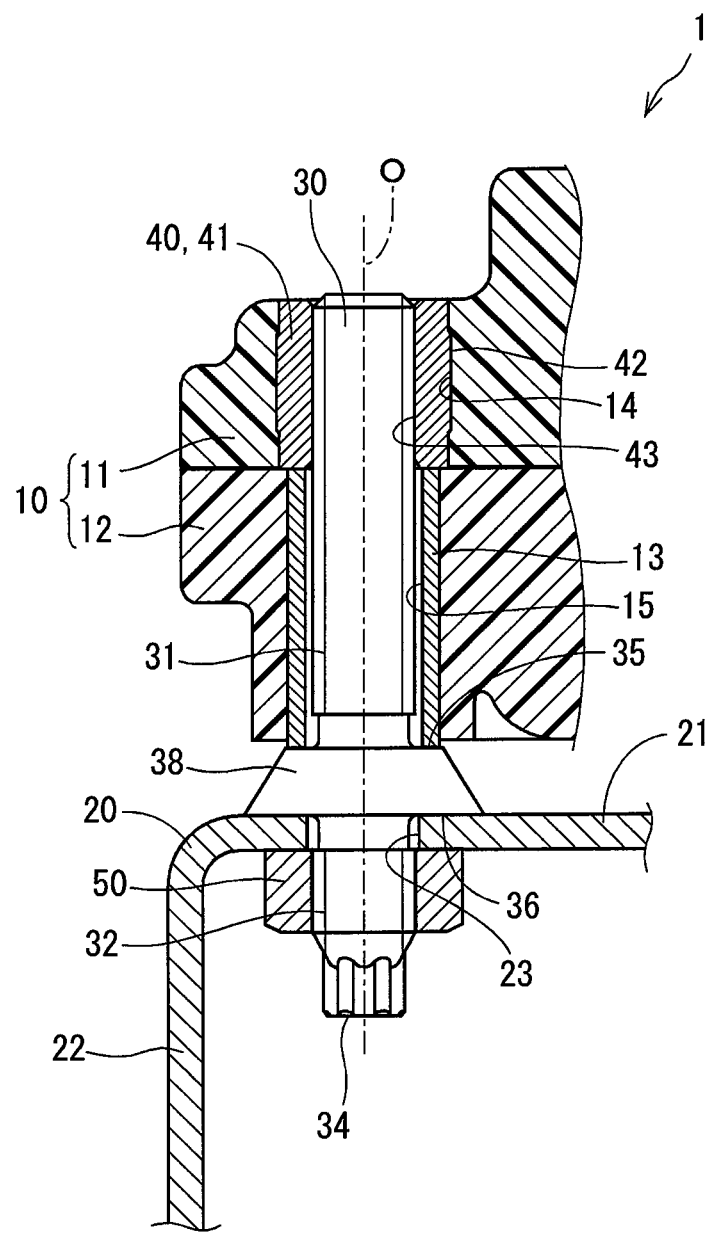
FIG. 8 is a partially sectional diagram illustrating a coupling structure according to a second embodiment of the present disclosure.

A second embodiment of the present disclosure is illustrated in FIG. 8. According to the second embodiment, a large diameter portion 38 of a stud bolt 30 has a tapered shape in which the large diameter portion 38 gradually increases in outer diameter from a first thread portion 31 toward a second thread portion 32. In the second embodiment, a first contact surface 35 of the large diameter portion 38 that faces the first thread portion 31 contacts an end surface of a collar 13 of a first member 10. A second contact surface 36 of the large diameter portion 38 that faces the second thread portion 32 contacts a set portion 21 of a second member 20. Therefore, the stud bolt 30 is capable of fixing the first member 10 on a side of the large diameter portion 38 facing the first thread portion 31 and fixing the second member 20 on a side of the large diameter portion 38 facing the second thread portion 32.

Figure 9:
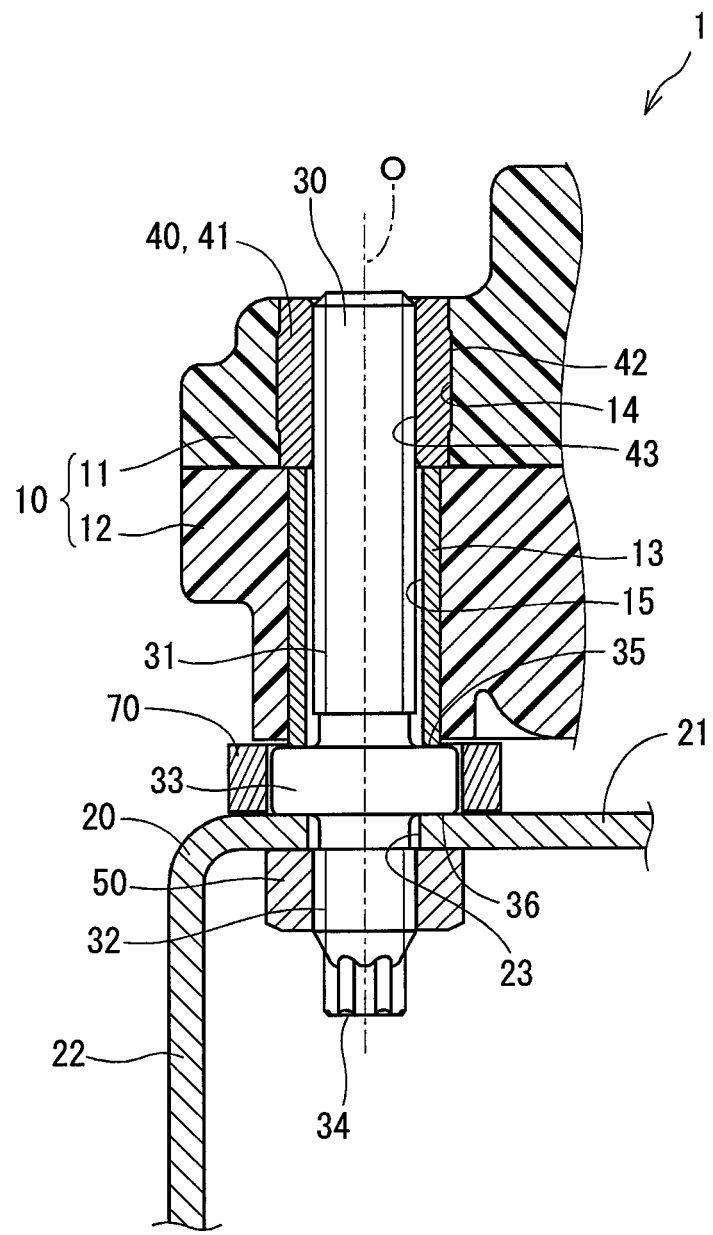
FIG. 9 is a partially sectional diagram illustrating a coupling structure according to a third embodiment of the present disclosure.

In the second embodiment, even if a tool such as a spanner is engaged with the large diameter portion 38, a contact area between the tool and the large diameter portion 38 is small. Therefore, the stud bolt 30 can be prevented from being rotated around an axis O of the stud bolt 30, Third Embodiment A third embodiment of the present disclosure is shown in FIG. 9. A coupling structure 1 of the third embodiment includes a cylinder member 70 on outside a large diameter portion 33 of a stud bolt 30 in a radial direction of the large diameter portion 33. The cylinder member 70 includes a continuous body in a circumferential direction of the large diameter portion 33 to have an O shape. The cylinder member 70 surrounds a radially outside of the large diameter portion 33. The cylinder member 70 may have a C shape in which a part of the continuous body in the circumferential direction is cut out. The cylinder member 70 may encloses the large diameter portion 33.

In the third embodiment, the large diameter portion 33 of the stud bolt 30 is surrounded by the cylinder member 70, and thus a tool such as a spanner cannot be engaged with the large diameter portion 33. Therefore, the coupling structure 1 is capable of protecting the stud bolt 30 from being rotated around an axis O by the tool. In the third embodiment, the stud bolt 30 may have a large diameter portion 37 having the hexagonal prism as shown in FIG. 7.

Fourth Embodiment

Figure 10:
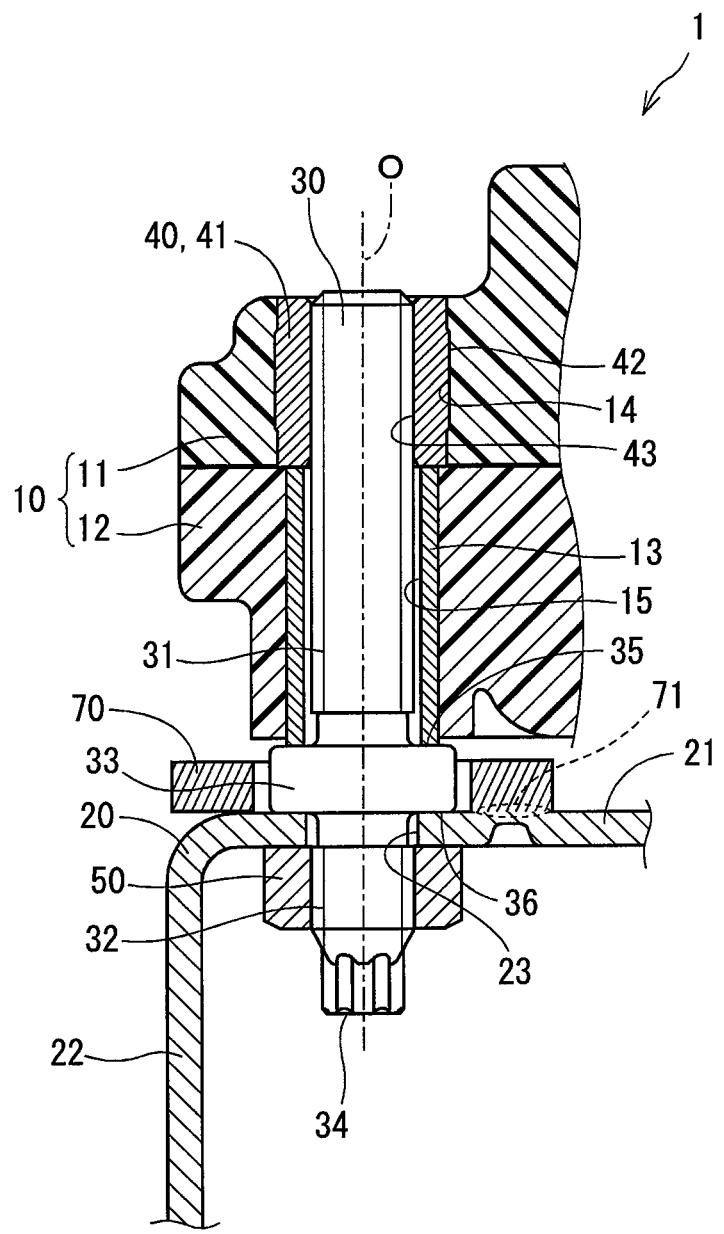
FIG. 10 is a partially sectional diagram illustrating a coupling structure according to a fourth embodiment of the present disclosure.

A fourth embodiment of the present disclosure is shown in FIG. 10. In a coupling structure 1 of the fourth embodiment, a second member 20 and a cylinder member 70 are bonded seamlessly by welding. A welded portion 71, in which the second member 20 and the cylinder member 70 are welded, is enclosed by a dashed line in FIG. 10. The welding of the second member 20 and the cylinder member 70 may be performed before attaching of a first member 10 to the second member 20 by a stud bolt 30. In the fourth embodiment, an increase in the number of parts can be limited by integrating the cylinder member 70 and the second member 20 into a single component. Therefore, when the first member 10, the second member 20 and the stud bolt 30 are integrated, the number of assembling processes can be reduced.

Fifth Embodiment

Figure 11:
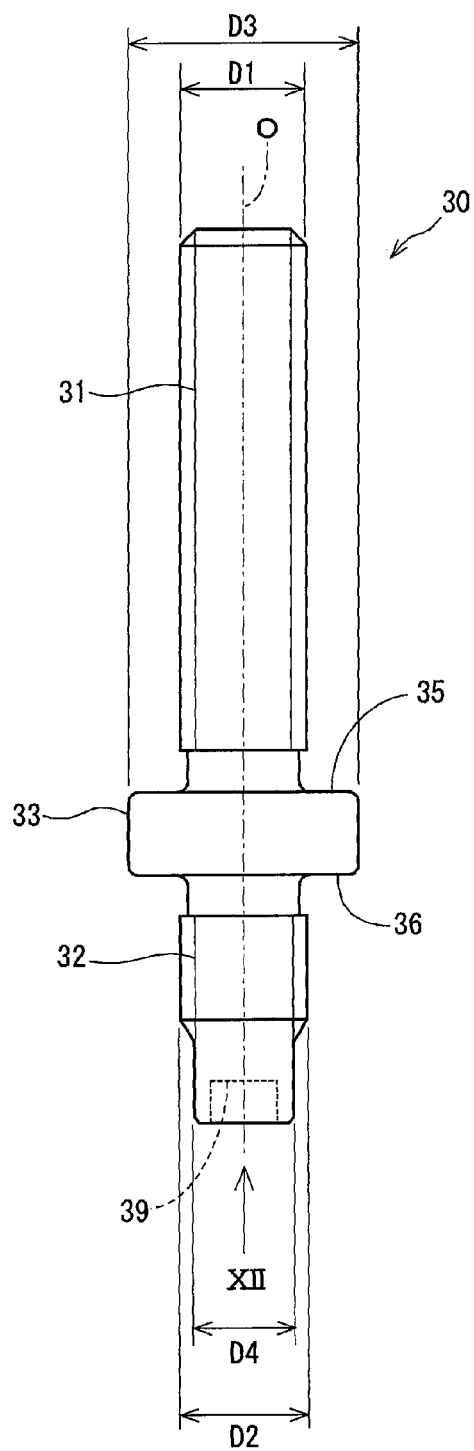
FIG. 11 is a side view illustrating a stud bolt according to a fifth embodiment of the present disclosure.
Figure 12:
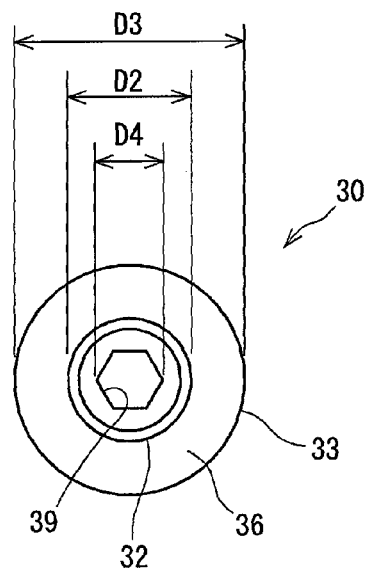
FIG. 12 is a diagram illustrating the stud bolt when the stud bolt is viewed from an arrow XII of FIG. 11.

A fifth embodiment of the present disclosure is shown in FIGS. 11 and 12. A stud bolt 30 of the fifth embodiment includes an engagement portion 39 that is provided on an end part of the stud bolt 30. The engagement portion 39 is positioned adjacent to a second thread portion 32 and has a hexagonal hole. A tool, such as a hex key, corresponding to a shape of the hexagonal hole can be engaged with the hexagonal hole. The engagement portion 39 may have a hexalobular hole instead of the hexagonal hole. The stud bolt 30 of the fifth embodiment has the same functions and effects as those of the first to fourth embodiments described above.

Although the present disclosure has been fully described in connection with the preferred embodiments thereof with reference to the accompanying drawings, it is to be noted that various changes and modifications will become apparent to those skilled in the art.

In the above-described embodiments, the first member 10 includes the upper member 11, the lower member 12 and the collar 13. But the first member 10 may be a single member in which the upper member 11, the lower member 12 and the collar 13 are integrated seamlessly. Alternatively, the first member 10 may have a through-hole, through which the first thread portion 31 extends, without having the collar 13.

In the above-described embodiments, the insert nut is press-fitted to the first member 10 as the first nut 40. Instead, a female thread that is engageable with the first thread portion 31 may be formed on an inner wall of a hole that is formed in the first member 10. In this case, the female thread may be used as an example of the female thread portion.

In the above-described fourth embodiment, the second member 20 and the cylinder member 70 is bonded by welding. However, the second member 20 and the cylinder member 70 may be bonded by adhesive bonding, for example. The second member 20 and the cylinder member 70 may be integrated by pressing, for example. The first member 10 and the cylinder member 70 may be fixed to each other or integrated into a single member.

In the above-described fourth embodiment, the welding of the second member 20 and the cylinder member 70 is performed before an integrating step of the first member 10 and the second member 20 by the stud bolt 30. Alternatively, the welding of the second member 20 and the cylinder member 70 may be performed after the integrating step of the first member 10 and the second member 20 by the stud bolt 30.

Additional advantages and modifications will readily occur to those skilled in the art. The disclosure in its broader terms is therefore not limited to the specific details, representative apparatus, and illustrative examples shown and described.

What is claimed is:

1. A coupling structure comprising:
 a stud bolt including:
  a first thread portion screwable into a first member about a screw axis;
  a second thread portion screwable into a second member about the screw axis and being provided coaxially with the first thread portion;
  an engagement portion provided on a side of the second thread portion, which is opposite from the first thread portion, an outer diameter of the engagement portion being smaller than an outer diameter of the second thread portion, the engagement portion being engageable with a fixing tool; and a large diameter portion having a circular cross-section that is perpendicular to the screw axis, the large diameter portion being located between the first thread portion and the second thread portion, an outer diameter of the large diameter portion being larger than an outer diameter of the first thread portion and the outer diameter of the second thread portion, a second member having a hole through which the second thread portion extends, the second member contacting the large diameter portion; and a nut engaged with the second thread portion, the nut fixing the second member on the large diameter portion, wherein the second member has a shielding portion that is positioned on an outside of the nut in a radial direction of the nut; and the shielding portion screens the nut and the engagement portion from outside the first member and the second member.

2. The coupling structure according to claim 1, wherein the large diameter portion has a first contact surface that is perpendicular to the screw axis and faces to the first thread portion, and the large diameter portion has a second contact surface that is perpendicular to the screw axis and faces to the second thread portion.

3. The coupling structure according to claim 1, wherein the large diameter portion has a circular cylindrical shape.

4. The coupling structure according to claim 1, wherein the large diameter portion has a tapered shape in which the large diameter portion gradually increases in outer diameter with distance from the first thread portion toward the second thread portion.

5. The coupling structure according to claim 1, further comprising a cylinder member that surrounds an outside of the large diameter portion of the stud bolt in a radial direction of the large diameter portion.

6. The coupling structure according to claim 5, further comprising a welded portion in which the first member or the second member is directly fixed to the cylinder member.

7. The coupling structure according to claim 5, wherein the cylinder member includes a continuous body having a C shape to partially surround the outside of the large diameter portion in the radial direction.

8. The coupling structure according to claim 5, wherein the cylinder member includes a continuous body having an O shape and extending in a circumferential direction of the large diameter portion to enclose the large diameter portion.

9. The coupling structure according to claim 1, wherein the female thread portion includes an insert nut.

10. The coupling structure according to claim 1, wherein the engagement portion is positioned at an end of the stud bolt.

11. The coupling structure according to claim 1, further comprising:
a first member having a hole through which the first thread portion of the stud bolt extends, the first member contacting the large diameter portion; and
a female thread portion provided inside the hole of the first member and engaged with the first thread portion, the female thread portion fixing the first member on the large diameter portion.

12. A coupling structure comprising:
a stud bolt including a large diameter portion, a first thread portion provided on one side of the large diameter portion coaxially with the large diameter portion, and a second thread portion provided on another side of the large diameter portion coaxially with the large diameter portion, an outer diameter of the large diameter portion being larger than an outer diameter of the first thread portion and an outer diameter of the second thread portion;
a second member having a hole through which the second thread portion of the stud bolt extends, the second member contacting the large diameter portion;
a nut engaged with the second thread portion, the nut fixing the second member on the large diameter portion; and
a cylinder member surrounding an outside of the large diameter portion of the stud bolt in a radial direction of the large diameter portion, wherein
the second member has a shielding portion that is positioned on an outside of the nut in a radial direction of the nut, and
the shielding portion screens the nut and the engagement portion from outside the first member and the second member.

13. The coupling structure according to claim 12, further comprising:
a first member having a hole through which the first thread portion of the stud bolt extends, the first member contacting the large diameter portion; and
a female thread portion provided inside the hole of the first member and engaged with the first thread portion, the female thread portion fixing the first member on the large diameter portion.

* * * * *